(12) United States Patent
Krachman

(10) Patent No.: US 10,355,516 B2
(45) Date of Patent: Jul. 16, 2019

(54) SELF-CHARGEABLE PORTABLE ELECTRONIC DEVICE WITH A COMPACT POWER GENERATING CIRCUITRY FOR CHARGING A RECHARGEABLE BATTERY

(71) Applicant: SONY CORPORATION, Tokyo (JP)

(72) Inventor: Evan Krachman, Shrewsbury, NJ (US)

(73) Assignee: SONY CORPORATION, Tokyo (JP)

( * ) Notice: Subject to any disclaimer, the term of this patent is extended or adjusted under 35 U.S.C. 154(b) by 134 days.

(21) Appl. No.: 15/481,152

(22) Filed: Apr. 6, 2017

(65) Prior Publication Data

US 2018/0294661 A1  Oct. 11, 2018

(51) Int. Cl.
  *H01M 10/44* (2006.01)
  *H01M 10/46* (2006.01)
  *H02J 7/34* (2006.01)
  *H02J 7/32* (2006.01)
  *G01P 15/125* (2006.01)

(52) U.S. Cl.
  CPC ............. *H02J 7/345* (2013.01); *H02J 7/32* (2013.01); *G01P 15/125* (2013.01)

(58) Field of Classification Search
  CPC .......................... H02J 7/0042; H02J 7/355
  USPC ............ 320/101, 112, 114, 115; 290/42, 50
  See application file for complete search history.

(56) References Cited

U.S. PATENT DOCUMENTS

| 8,350,519 | B2 | 1/2013 | Brantner et al. |
| 2011/0037260 | A1* | 2/2011 | Sadarnac ............ H02J 7/32 290/7 |
| 2013/0026766 | A1* | 1/2013 | Ocalan ............ H02K 7/1853 290/1 R |
| 2016/0275771 | A1 | 9/2016 | Visweswara et al. |

OTHER PUBLICATIONS

Kymissis, et al., "Parasitic Power Harvesting in Shoes", Presented at the Second IEEE International Conference on Wearable Computing, Aug. 1998, pp. 1-8.

Yusuf, et al., "Mechanical Energy Harvesting Devices for Low Frequency Applications: Revisited", ARPN Journal of Engineering and Applied Sciences, vol. 8, No. 7, Jul. 2013, pp. 504-512.

\* cited by examiner

*Primary Examiner* — Edward Tso
(74) *Attorney, Agent, or Firm* — Chip Law Group

(57) ABSTRACT

Various aspects of a self-chargeable portable electronic device with a power generating circuitry and a method to charge a rechargeable battery by the power generating circuitry are disclosed. The power generating circuitry includes an accelerometer that is configured to generate a sensing pulse based on activation of the accelerometer. The power generating circuitry also includes a plurality of capacitors and one or more circuits. The one or more circuits are configured to receive the sensing pulse from the accelerometer. The plurality of capacitors are charged based on the received sensing pulse. The one or more circuits are configured to control transfer of power from the charged plurality of capacitors to a battery.

18 Claims, 5 Drawing Sheets

SELF-CHARGEABLE PORTABLE ELECTRONIC DEVICE WITH A COMPACT POWER GENERATING CIRCUITRY FOR CHARGING A RECHARGEABLE BATTERY

CROSS-REFERENCE TO RELATED APPLICATIONS/INCORPORATION BY REFERENCE

None.

FIELD

Various embodiments of the disclosure relate to a self-chargeable portable electronic device. More specifically, various embodiments of the disclosure relate to a self-chargeable portable electronic device with a power generating circuitry and a method to charge a rechargeable battery by the power generating circuitry.

BACKGROUND

With the rapid increase in demand for portable, battery-powered electronic devices, such as cellular phones and gaming consoles, the requirement of necessary power to operate these devices have also increased. The consumer electronics industry is striving to find ways and means to increase the battery life, mostly, by efficient management of battery consumption by use of software applications or by an increase in battery capacity. Another way the consumer electronics industry is trying to fix the power requirement problem is by adopting wireless charging technologies so that users are less dependent on fixed power outlets or bulky power banks to charge the rechargeable batteries. However, such wireless charging technologies have inherent limitation as a charging mat or base is required and the device needs to be within certain distance from the power outlet to draw power. Further, there has been some nascent efforts to develop technologies related to photovoltaic solar cells for use in portable, battery-powered electronic devices, such as cellular phones. However, there is significant constraint related to size-versus-yield ratio for solar panels that employ such photovoltaic solar cells to harness sunlight for energy. For example, large solar panels may be required to generate sufficient power, which are not suited for portable, battery-powered electronic devices, such as cellular phones, tablets, and gaming consoles. Further, mandatory sunlight or diffused light requirement is another limitation of such solar panels. Thus, the growing market of these portable, battery-powered electronic devices demands new ways of microelectronic circuits design and technologies with an ability of personal power generation, for example, a self-chargeable portable electronic device. A cost-effective and compact power generating circuitry with high yield capability that may suitably fit within a portable, battery-powered electronic device, may be required to reduce the demand on the electric infrastructure.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A power generating circuitry, a self-chargeable portable electronic device with the power generating circuitry, and a method to charge a rechargeable battery by the power generating circuitry are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various implementations may be found in a power generating circuitry, a self-chargeable portable electronic device with the power generating circuitry, and a method to charge a rechargeable battery by the power generating circuitry. Exemplary aspects of the disclosure may include a method to charge a rechargeable battery by the power generating circuitry. The power generating circuitry may include at least an accelerometer, a plurality of capacitors, and one or more circuits. The accelerometer may be configured to generate a sensing pulse based on a movement detected by the accelerometer provided in the power generating circuitry. The one or more circuits may be configured to receive the sensing pulse from the accelerometer. The plurality of capacitors may be charged based on the received sensing pulse. The one or more circuits may be further configured to control transfer of power from the charged plurality of capacitors to a battery.

In accordance with an embodiment, the one or more circuits are further configured to charge the plurality of capacitors for a first time period based on the movement of the power generating circuitry that causes the accelerometer to be activated to generate the sensing pulse. The one or more circuits are further configured to control a flow of current to the plurality of capacitors when the plurality of capacitors are charged based on the received sensing pulse. The one or more circuits may be configured to restrict the transfer of power from the plurality of capacitors to the battery based on a current charge status of the battery and a first specified threshold.

In accordance with an embodiment, a protective layering may be provided to cover the accelerometer, the plurality of capacitors, and the one or more circuits to seal current leakage from the power generating circuitry. The one or more circuits are further configured to transfer a defined amount of power to the accelerometer for the generation of the sensing pulse when a current charge status of the battery is less than a second specified threshold.

Figure 1A:
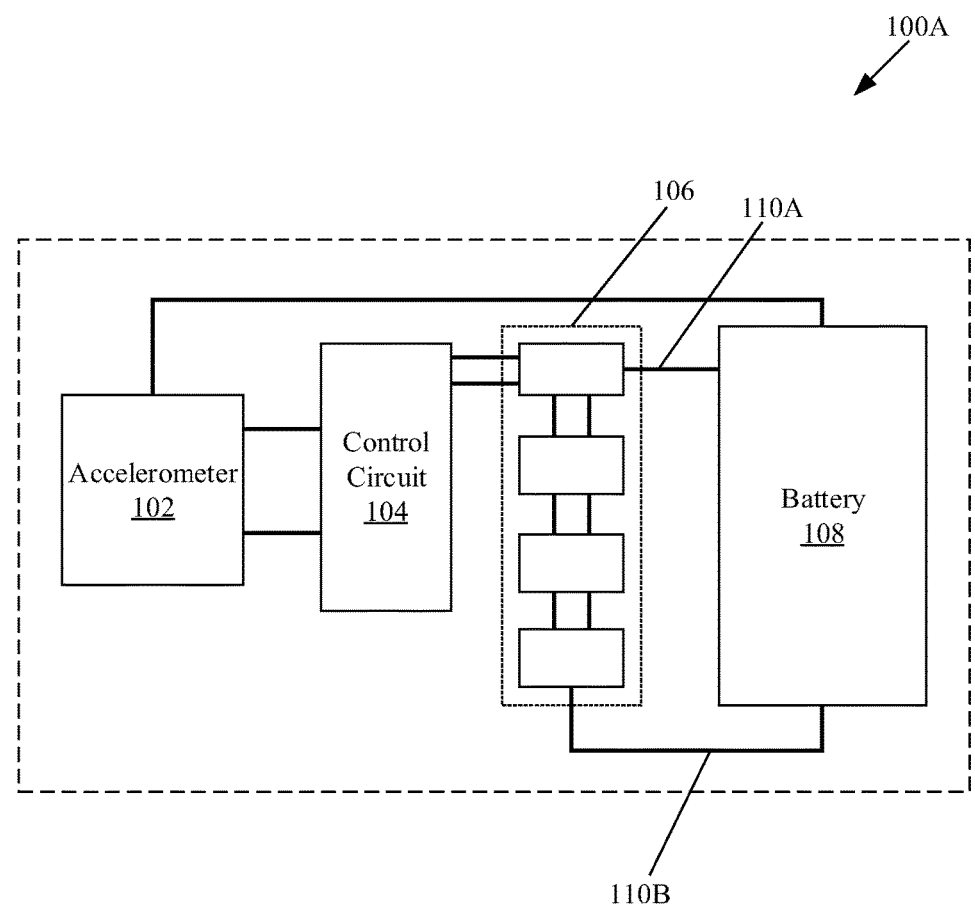
FIG. 1A is a block diagram that illustrates a first exemplary power generating circuitry, in accordance with an embodiment of the disclosure.

FIG. 1A is a block diagram that illustrates a first exemplary power generating circuitry, in accordance with an embodiment of the disclosure. With reference to FIG. 1A, there is shown a power generating circuitry 100A. The power generating circuitry 100A may include an accelerometer 102, a control circuit 104, a plurality of capacitors 106, and a battery 108. The accelerometer 102 may be connected to the control circuit 104 and the battery 108. The control circuit 104 may be connected to the accelerometer 102 and the plurality of capacitors 106. The plurality of capacitors 106 may be further connected to the battery 108 via output terminals 110A and 110B, as shown.

The accelerometer 102 may comprise suitable logic, circuitry, interfaces, and/or code that may be configured to generate a sensing pulse. The accelerometer 102 may refer to a Micro Electro Mechanical System (MEMS) that senses forces of acceleration caused due to gravity of movement or a tilting action. The sensing pulse may be generated when a motion is sensed by the accelerometer 102. For example, the power generating circuitry 100A may be integrated with a portable electronic device, such as a smartphone (described in FIG. 2). The accelerometer 102 may detect a motion of the portable electronic device in X, Y, and Z axes. The detected motion may activate the accelerometer 102 to generate the sensing pulse.

The control circuit 104 may be configured to receive the sensing pulse from the accelerometer 102. The control circuit 104 may be configured to utilize the sensing pulse from the accelerometer 102 to charge the plurality of capacitors 106. The control circuit 104 may be further configured to control transfer of power from the charged plurality of capacitors to the battery 108.

The plurality of capacitors 106 may be charged based on the sensing pulse received from the accelerometer 102. The flow of current to the plurality of capacitors 106 may be controlled by the control circuit 104 at the time of charging of the plurality of capacitors 106. The plurality of capacitors 106 may be charged based on continuous or intermittent receipt of sensing pulse(s). In some embodiments, the plurality of capacitors 106 may be connected in parallel. In some other embodiments, the plurality of capacitors 106 may be connected in series or a combination of series and parallel.

The battery 108 refers to a rechargeable battery. In some embodiments, the battery 108 may be integrated as a part of the power generating circuitry 100A. In some embodiments, the battery 108 may refer to a rechargeable battery of a host device, such as the portable electronic device, in which the power generating circuitry 100A is provided. In such embodiments, the output terminals 110A and 110B extending from the plurality of capacitors 106 may be connected with the positive and negative terminals of the rechargeable battery of the host device. Examples of the battery 108 may include, but are not limited to lithium ion (such as dual stack lithium ion), lead-acid, nickel cadmium (NiCd), nickel metal hydride (NiMH), and lithium ion polymer (Li-ion polymer). In some embodiments, instead of a single battery, a plurality of batteries may be stacked. The stacking of batteries may provide a larger capacity due to the ability to store more power (energy) packed with more cells. For example, as the portable electronic devices, such as smartphones and other personal electronic devices include more functionality, sensors, and applications, energy demand will keep on increasing to support these functionalities, sensors, and applications. Thus, the stacking of batteries may be advantageous and provide an expanded capacity of energy storage. For instance, global positioning system (GPS) based or other application based location services may benefit from the expanded capacity due to stacking, for example, a dual stacked or quad stacked Li-ion battery.

Figure 2:
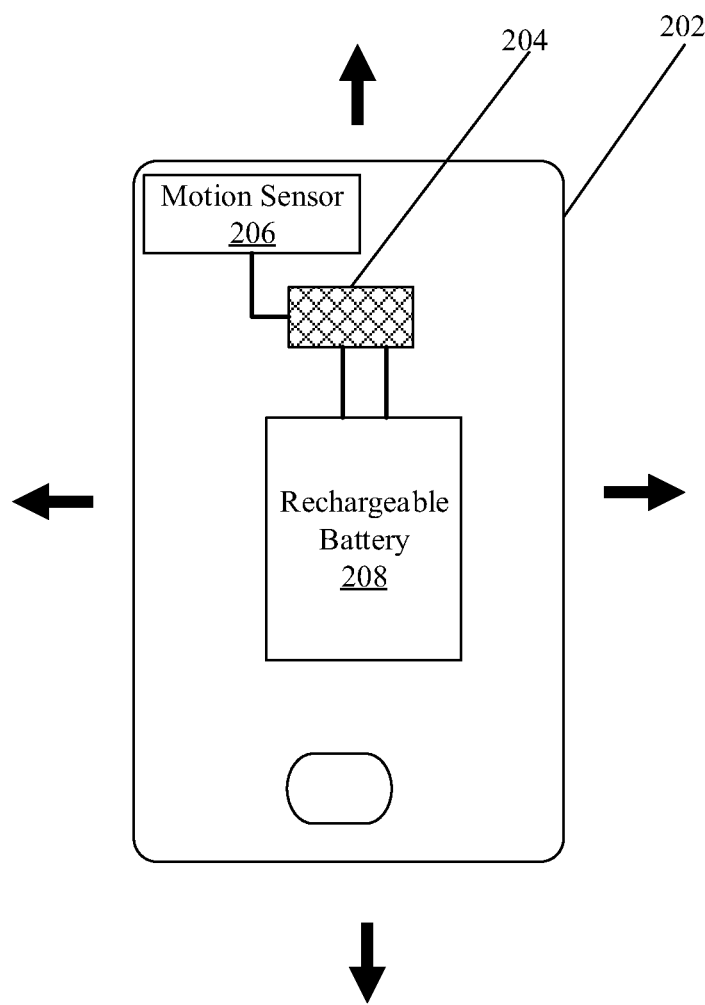
FIG. 2 illustrates a first exemplary scenario for implementation of the disclosed power generating circuitry and method to charge a rechargeable battery, in accordance with an embodiment of the disclosure.
Figure 3:
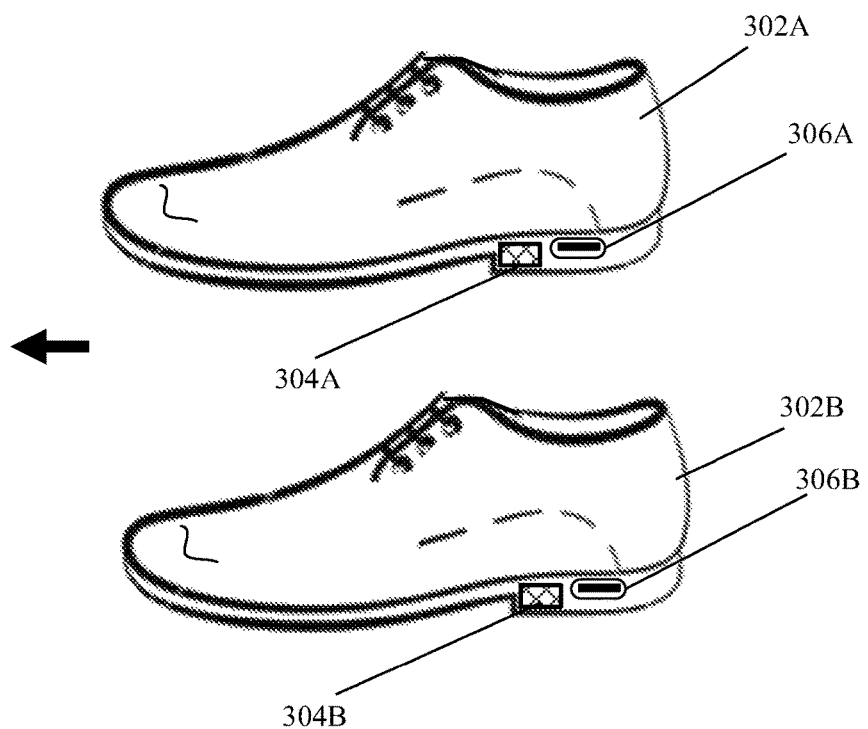
FIG. 3 illustrates a second exemplary scenario for implementation of the disclosed power generating circuitry and method to charge a rechargeable battery, in accordance with an embodiment of the disclosure.

The power generating circuitry 100A may be an electronic circuit of a specified size adapted to be integrated within a portable electronic device, such as a smartphone, a wearable device, a hand-held gaming device, or other portable objects (exemplary implementation, for example, are described in FIGS. 2 and 3). Based on the movement of the portable electronic device, the power generating circuitry 100A, integrated within the portable electronic device, is capable of recharging a rechargeable battery, such as the battery 108, of the host device, such as the portable electronic device. The power generating circuitry 100A may be used for personal power generation as the power generating circuitry 100A provides a self-charging ability to the rechargeable battery (such as the battery 108) of the portable electronic device, based on the movement of the portable electronic device.

In operation, the accelerometer 102 may generate a sensing pulse based on a movement sensed by the accelerometer 102. The accelerometer 102 may be activated based on the movement sensed by the accelerometer 102 and then generate the sensing pulse. The control circuit 104 may be configured to receive the sensing pulse from the accelerometer 102. The control circuit 104 may be configured to charge the plurality of capacitors 106 based on the received sensing pulse. The sensing pulse(s) may be generated continuously or intermittently generated as and when movement(s) is/are sensed by the accelerometer 102. The control circuit 104 may be configured to charge the plurality of capacitors 106 for a first time period based on the movement of the power generating circuitry 100A, which in turn causes the accelerometer 102 to be activated to generate the sensing pulse.

Conventionally, accelerometers are used for their motion detection capability. In certain conventional devices, for example, detected motion, such as a free-fall motion, is then utilized to activate certain protection mechanism to protect a portable electronic device from the free-fall. Further, accelerometers in portable electronic devices, such as smartphones, are widely used to detect a change in orientation or tilt. Certain accelerometers comprise microscopic crystal structures. Such microscopic crystal structures may be stressed as a result of the accelerative forces, and as a result of the stress, a voltage is created. Typically, such accelerometers use the voltage solely to determine velocity and orientation, and the created voltage gets wasted. The power generating circuitry 100A is configured such that such created voltage may be harvested by the power generating circuitry 100A, as the sensing pulse, to charge the plurality of capacitors 106. Further, certain accelerometers, for example, accelerometers used in smartphones are MEMS that comprise thin layer of silicon structures used as "Seismic mass". When there is a movement, such as the smartphone is tilted, the Seismic mass changes its position, which in turn causes a change in capacitive voltage. This change in capacitive voltage may be harvested by the power generating circuitry 100A, as the sensing pulse, to charge the plurality of capacitors 106.

In accordance with an embodiment, the control circuit 104 may be configured to control a flow of current to the plurality of capacitors 106 when the plurality of capacitors 106 are charged based on the received sensing pulse. The control circuit 104 may be configured to control transfer of power from the charged plurality of capacitors 106 to the battery 108. In accordance with an embodiment, the control circuit 104 may be configured to detect a current charge status of the battery 108. In cases where the current charge status of the battery 108 is less than a first specified threshold (a first power limit, for example, 80 or 90%), the control circuit 104 may be further configured to control transfer of power from the charged plurality of capacitors 106 to the battery 108. In cases where the current charge status of the battery 108 is greater than or equal to the first specified threshold, the control circuit 104 may be configured to restrict the transfer of power from the plurality of capacitors 106 to the battery 108. The control circuit 104 may be configured to transfer a defined amount of power to the accelerometer 102 for the generation of the sensing pulse and activation of the power generating circuitry 100A itself when the current charge status of the battery 108 is less than a second specified threshold (another specified lower limit, for example 10%).

Figure 1B:
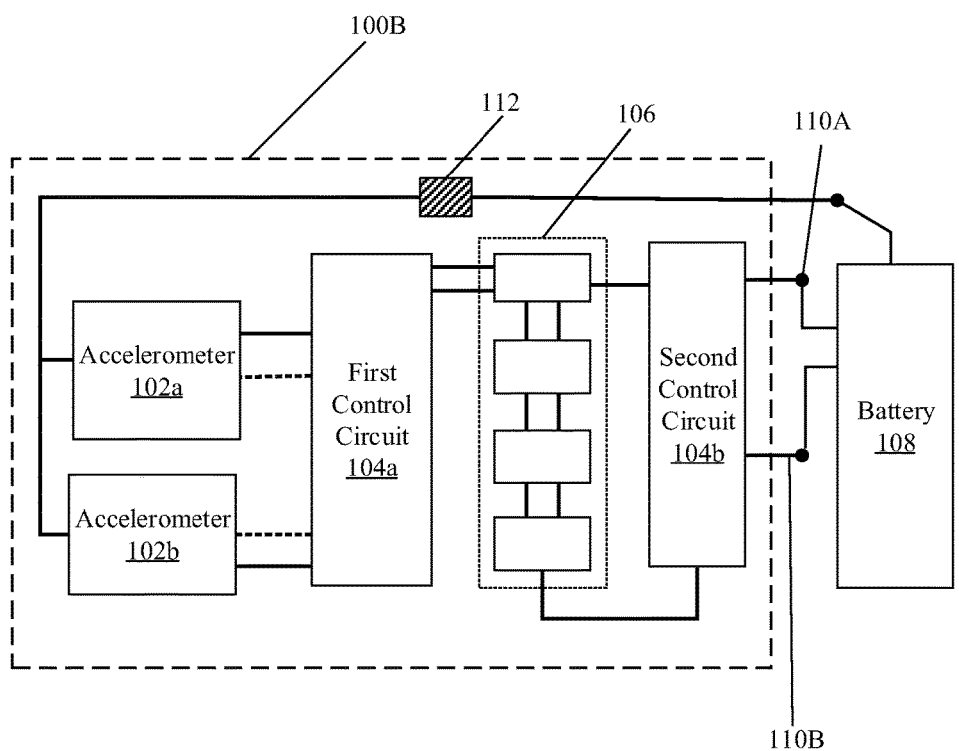
FIG. 1B is a block diagram that illustrates a second exemplary power generating circuitry, in accordance with an alternative embodiment of the disclosure.

FIG. 1B is a block diagram that illustrates a second exemplary power generating circuitry, in accordance with an embodiment of the disclosure. With reference to FIG. 1B, there is shown a power generating circuitry 100B. Instead of a single accelerometer, as shown and described in the power generating circuitry 100A, the power generating circuitry 100B employs a plurality of accelerometers 102a and 102b to generate appropriate voltage to charge the plurality of capacitors 106. The number of accelerometers to be used may be determined based on chip design requirements, a capacity of the battery to be charged, and a pre-availability of other motion sensors, such as a gyroscope or an accelerometer, in the portable electronic device in which the power generating circuitry 100B is to be provided.

The power generating circuitry 100B may further include a first control circuit 104a, a second control circuit 104b, a switching circuit 112, and the plurality of capacitors 106 (of FIG. 1A). With reference to FIG. 1B, the battery 108 may refer to a rechargeable battery of the portable electronic device (i.e. the host device), and may not be a part of the power generating circuitry 100B. The plurality of accelerometers 102a and 102b may be connected to the first control circuit 104a and the switching circuit 112. The first control circuit 104a and the second control circuit 104b may be further connected to the plurality of capacitors 106. The second control circuit 104b may be connected to the battery 108 via the output terminals 110A and 110B, as shown.

In operation, the plurality of accelerometers 102a and 102b may generate sensing pulses when movement of the portable electronic device (which includes the power generating circuitry 100B) is sensed by the plurality of accelerometers 102a and 102b. The first control circuit 104a may be configured to utilize the generated sensing pulse to charge the plurality of capacitors 106. The first control circuit 104a may be configured to draw current from the sensing pulse and transfer to the plurality of capacitors 106. The plurality of capacitors 106 accumulates charge each time movement is sensed by the plurality of accelerometers 102a and 102b. Once the plurality of capacitors 106 are completely charged, the first control circuit 104a restricts the flow of current to the plurality of capacitors 106. The second control circuit 104b may be configured to periodically monitor the current charge status of the battery 108. In cases where the current charge status of the battery 108 is less than the first specified threshold, the second control circuit 104b may be configured to transfer power from the charged plurality of capacitors 106 to the battery 108. The plurality of capacitors 106 may be discharged as power is transferred to the battery 108. When the plurality of capacitors 106 gets discharged, the first control circuit 104a may be activated to further receive the sensing pulse and allow passing of current through it towards the plurality of capacitors 106. In cases where the current charge status of the battery 108 is equal to or more than the first specified threshold (e.g. 80 or 90% upper limit), the second control circuit 104b may be configured to restrict the transfer of power from the charged plurality of capacitors 106 to the battery 108.

The second control circuit 104b may be configured to communicate a control signal to the switching circuit 112 to transfer a defined amount of power (a small voltage) from the battery 108 to the plurality of accelerometers 102a and 102b. This activates the power generating circuitry 1006 if no charge is present or when the current charge status of the battery 108 is less than the second specified threshold (e.g. 10% power limit). The switching circuit 112 may momentarily turn on to allow the defined amount of power to flow through it.

FIG. 2 illustrates a first exemplary scenario for implementation of the disclosed power generating circuitry and method to charge a rechargeable battery, in accordance with an embodiment of the disclosure. FIG. 2 is explained in conjunction with elements from FIG. 1A and FIG. 1B. With reference to FIG. 2, there is shown a portable electronic device 202. The portable electronic device 202 includes a power generating circuitry 204, a motion sensor 206, and a rechargeable battery 208.

In accordance with the first exemplary scenario, the portable electronic device 202 may be a smartphone. The power generating circuitry 204 may correspond to the power generating circuitry 100A or 100B (FIGS. 1A and 1B). The motion sensor 206 may corresponds to the accelerometer 102 (FIG. 1A). In some embodiments, the motion sensor 206 may correspond to the plurality of accelerometers 102a and 102b (FIG. 1B) or a combination of the accelerometer 102 and a gyroscope. The rechargeable battery 208 may correspond to the battery 108 (FIG. 1A).

In accordance with the first exemplary scenario, a user may move while carrying the portable electronic device 202 or move/tilt the portable electronic device 202. The motion sensor 206 (e.g. the accelerometer 102) in the portable electronic device 202 may be configured to generate a sensing pulse based on activation of the motion sensor 206. The movement of the portable electronic device 202 may cause the motion sensor 206 to activate so as to generate the sensing pulse. In other words, the activation refers to the movement based activation of the motion sensor 206. A control circuit (for example, the control circuit 104 or the first control circuit 104a) may be provided in the power generating circuitry 204, which may be configured to receive the sensing pulse from the motion sensor 206. The control circuit may be configured to charge the plurality of capacitors 106 provided in the power generating circuitry 204, based on the received sensing pulse. The control circuit may be configured to charge the plurality of capacitors 106 for a first time period based on movements of the portable electronic device 202. The control circuit in the power generating circuitry 204 may be further configured to control transfer of power (or voltage/current) from the charged plurality of capacitors 106 to the rechargeable battery 208 of the portable electronic device 202. The power generating circuitry 204 is cost-effective as it may utilize existing resources, such as the motion sensor 206 (e.g. the accelerometer 102), of the portable electronic device 202 to harvest power. The power generating circuitry 204 is compact and adapted such that it suitably fits within the portable electronic device 202. The power generating circuitry 204 provides an ability of personal power generation by harvesting power from the movements of the portable electronic device 202. The power generating circuitry 204 provides a self-charging ability to the rechargeable battery 208, which reduces the demand on the existing electric infrastructure. In certain scenarios where fixed power outlets or external power banks are not available to charge the rechargeable battery 208, the sensing pulse generated by the motion sensor 206 may be utilized to recharge the rechargeable battery 208.

FIG. 3 illustrates a second exemplary scenario for implementation of the disclosed power generating circuitry and method to charge a rechargeable battery, in accordance with an embodiment of the disclosure. FIG. 3 is explained in conjunction with elements from FIG. 1A and FIG. 1B. With reference to FIG. 3, there is shown a portable object, such as a pair of shoes 302A and 302B. A power generating circuitry may be embedded in each of the pair of shoes 302A and 302B. For example, the shoe 302A includes a power generating circuitry 304A and a power outlet 306A. The shoe 302B includes a power generating circuitry 304B and a power outlet 306B. It is to be understood to a person of ordinary skill in the art that although the pair of shoes 302A and 302B are shown as portable objects, the disclosed power generating circuitry may be embedded in other portable devices or objects, such as other types of footwear, fashion accessories, wearable devices, automobile or bicycle tires, movable toys, an action cam, and the like, without limiting the scope of the disclosure.

In accordance with the second exemplary scenario, the power generating circuitry 304A and 304B may correspond to the power generating circuitry 100A or 100B (FIGS. 1A and 1B). The power outlets 306A and 306B may refer to a universal serial bus (USB) port or other interfaces capable of supplying electric power across a wired connection, for example, a cable, or wirelessly to external devices that require power. The power generating circuitry 304A and the 304B may be covered by a protective layering to seal current leakage from the power generating circuitry 304A and the 304B. For example, the protective layering may be made of an epoxy polymer or other type of insulating material known in the art. The power generating circuitry 304A and 304B may be embedded in the sole of the shoes 302A and 302B, as shown, or other suitable location. Each time the shoes 302A and 302B makes a contact with a surface, the accelerometer(s) coupled to/provided within the power generating circuitry 304A and 304B may be activated, which in turn generates a sensing pulse. The power generating circuitry 304A and 304B may be configured to utilize the sensing pulse to charge the plurality of capacitors 106, and finally store power in the battery 108 for future use. The power outlets 306A and 306B may function as an interface to connect to external devices that may need power. Each of the power outlets 306A and 306B may be protected and covered with a flap that may be hinged or attached on the shoe body to cover the power outlets 306A and 306B.

In some embodiments, an application may be provided in the portable electronic device 202 (such as a smartphone) or other personal electronic device that may wirelessly monitor the current charge status of the battery 108 or a charging status/operations of the power generating circuitry 100A, 100B, 204, 304A, or 304B. It may be useful to a consumer (an end user) to be able to monitor the current charge status of the battery 108. The application may be referred to as a "Motion to Full Gauge (MTF)" application, which based on the monitoring may indicate the current charge status of the battery 108 based on motion and/or also determine in real time or near-real time, as to how many steps (walk steps) to full capacity of the battery 108 would be required.

In some embodiments, the disclosed power generating circuitry (for example, the power generating circuitry 100A, 100B, 204, 304A, or 304B) may be mounted on a printed circuit board (PCB) as a chip. In some embodiments, the disclosed power generating circuitry (for example, the power generating circuitry 100A, 100B, 204, 304A, or 304B) covered with the protective layering, may be embedded in a rubber sheath that may withstand the pressure of a tire, and still generate the sensing pulse utilized to charge the plurality of capacitors 106. In this case, the power generation is not dependent on the mechanical movement of the vehicles with the tire, but the movement that causes the accelerometer, provided within the power generating circuitry, to generate the sensing pulse. In accordance with an embodiment, one or more chemical reactions may generate necessary potential difference for flow of current to charge the plurality of capacitors 106. Alternatively in some embodiments, functionalities of the control circuits, the plurality of capacitors 106, and the accelerometers (such as the accelerometer 102), to recharge the battery 108 (or the rechargeable battery 208) may be replaced by a sealed chemical reaction. The chemical reaction occurring in a sealed unit may generate necessary voltage/current that may be stored in a power storage unit for future use.

Figure 4:
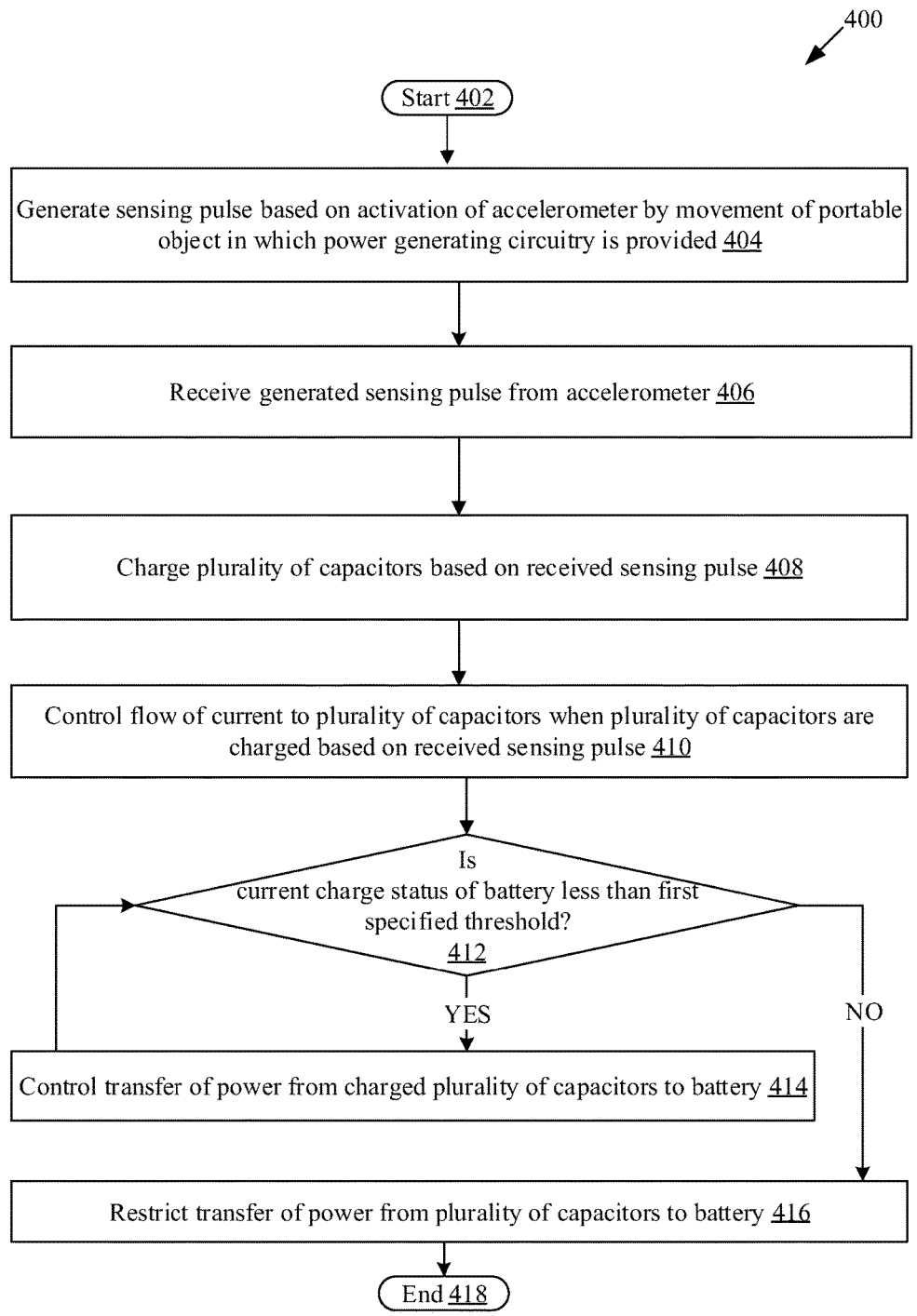
FIG. 4 is a flowchart that illustrates a method to charge a rechargeable battery, in accordance with an embodiment of the disclosure.

FIG. 4 is a flowchart that illustrates a method to charge a rechargeable battery, in accordance with an embodiment of the disclosure. With reference to FIG. 4, there is shown a flowchart 400. The flowchart 400 is described in conjunction with FIGS. 1A, 1B, 2, and 3. The method, implemented in the power generating circuitry 100A and 100B, starts at 402 and proceeds to step 404.

At 404, a sensing pulse may be generated based on activation of the accelerometer by a movement of a portable object in which the power generating circuitry 100A and 100B is provided. The accelerometer (such as the accelerometer 102 or the plurality of accelerometers 102a and 102b) or the combination of the accelerometer 102 and the gyroscope, may generate the sensing pulse. At 406, the generated sensing pulse may be received from the accelerometer. The one or more circuits (such as the control circuit 104 or the first control circuit 104a) may be configured to receive the generated sensing pulse from the accelerometer.

At 408, the plurality of capacitors 106 may be charged based on the received sensing pulse. The one or more circuits (such as the control circuit 104 or the first control circuit 104a) may be configured to charge the plurality of capacitors 106 based on the received sensing pulse(s). At 410, a flow of current to the plurality of capacitors 106 may be controlled when the plurality of capacitors 106 are charged based on the received sensing pulse(s). The one or more circuits (such as the control circuit 104 or the first control circuit 104a) may be configured to control the flow of current to the plurality of capacitors 106 at the time of charging of the plurality of capacitors 106.

At 412, it may be checked whether a current charge status of the battery 108 is less than a first specified threshold. In cases where the current charge status of the battery 108 is less than the first specified threshold, the control passes to 414. In cases where the current charge status of the battery 108 is equal to or more than the first specified threshold, the control passes to 416. At 414, transfer of power from the charged plurality of capacitors 106 to the battery 108 may be controlled. The one or more circuits (such as the control circuit 104 or the second control circuit 104b) may be configured to control the transfer of power from the charged plurality of capacitors 106 to the battery 108.

At 416, the transfer of power from the plurality of capacitors 106 to the battery 108 may be restricted. The one or more circuits (such as the control circuit 104 or the second control circuit 104b) may be configured to restrict the transfer of power from the plurality of capacitors 106 to the battery 108. The control may pass to end 418.

In accordance with an embodiment of the disclosure, a power generating circuitry is disclosed. The power generating circuitry (such as the power generating circuitry 304A and 304B (FIGS. 1A and 1B)) may include at least an accelerometer (such as the accelerometer 102 (FIG. 1A)), a plurality of capacitors (such as the plurality of capacitors 106 (FIGS. 1A and 1B)), and one or more circuits (such as the control circuit 104; or the first control circuit 104a and the second control circuit 104b (FIGS. 1A and 1B)). The accelerometer may be configured to generate a sensing pulse based on a movement detected by the accelerometer provided in the power generating circuitry. The one or more circuits may be configured to receive the sensing pulse from the accelerometer. The one or more circuits may be configured to charge the plurality of capacitors based on the received sensing pulse. The one or more circuits may be further configured to control transfer of power (voltage/current) from the charged plurality of capacitors to a battery (such as the battery 108 (FIGS. 1A and 1B)).

In accordance with an embodiment of the disclosure, a portable electronic device is disclosed. The portable electronic device (such as the portable electronic device 202 (FIG. 2)) may include a battery (such as the battery 108 (FIGS. 1A and 1B)), a motion sensor (such as the motion sensor 206 (FIG. 2)) configured to generate a sensing pulse based on activation of the motion sensor, and a power generating circuitry (such as the power generating circuitry 304A and 304B (FIGS. 1A and 1B)). The power generating circuitry may comprise a plurality of capacitors (such as the plurality of capacitors 106 (FIGS. 1A and 1B)) and one or more circuits (such as the control circuit 104; or the first control circuit 104a and the second control circuit 104b (FIGS. 1A and 1B)). The one or more circuits may be configured to receive the sensing pulse from the motion sensor. The one or more circuits may be configured to charge the plurality of capacitors based on the received sensing pulse. The one or more circuits may be further configured to control transfer of power from the charged plurality of capacitors to the battery.

The one or more circuits are further configured to charge the plurality of capacitors for a first time period based on movement of the portable electronic device that causes the motion sensor to activate to generate the sensing pulse. The motion sensor may be an accelerometer that is activated by movement of the portable electronic device, and where the sensing pulse, generated by the accelerometer on the activation, is utilized to recharge the battery. In some embodiments, the motion sensor may be a gyroscope that is activated by movement of the portable electronic device, and where the sensing pulse, generated by the gyroscope on the activation, is utilized to recharge the battery. The one or more circuits are further configured to control a flow of current to the plurality of capacitors when the plurality of capacitors are charged based on the received sensing pulse. The one or more circuits are further configured to restrict the transfer of power from the plurality of capacitors to the battery based on a current charge status of the battery and a first specified threshold. The one or more circuits are further configured to transfer a defined amount of power to the motion sensor for the generation of the sensing pulse when a current charge status of the battery is less than a second specified threshold.

The present disclosure may be realized in hardware, or a combination of hardware and software. The present disclosure may be realized in hardware that comprises a portion of an integrated circuit that also performs other functions. While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A power generating circuitry, comprising:
    an accelerometer configured to generate a sensing pulse based on activation of said accelerometer;
    a plurality of capacitors; and
    one or more circuits configured to:
        receive said sensing pulse from said accelerometer;
        charge said plurality of capacitors based on said received sensing pulse; and
        control transfer of power from said charged plurality of capacitors to a battery based on a current charge status of said battery.

2. The power generating circuitry according to claim 1, wherein said one or more circuits are further configured to charge said plurality of capacitors for a first time period based on a movement of a portable electronic device that includes said power generating circuitry, and wherein said accelerometer is activated based on said movement of said portable electronic device.

3. The power generating circuitry according to claim 1, wherein said one or more circuits are further configured to control a flow of current to said plurality of capacitors based on a determination that said plurality of capacitors are charged.

4. The power generating circuitry according to claim 1, wherein said one or more circuits are further configured to restrict said transfer of power from said plurality of capacitors to said battery based on said current charge status of said battery and a first specified threshold value.

5. The power generating circuitry according to claim 1, further comprising a protective layering that covers said accelerometer, said plurality of capacitors, and said one or more circuits to seal current leakage from said power generating circuitry.

6. The power generating circuitry according to claim 1, wherein said one or more circuits are further configured to transfer a defined amount of power to said accelerometer for said generation of said sensing pulse, and wherein said transfer of said defined amount of power is based on said current charge status of said battery being less than a second specified threshold value.

7. A portable electronic device, comprising:
    a battery;
    a motion sensor configured to generate a sensing pulse based on activation of said motion sensor; and a power generating circuitry that comprises:
   a plurality of capacitors; and
   one or more circuits configured to:
      receive said sensing pulse from said motion sensor;
      charge said plurality of capacitors based on said received sensing pulse; and
      control transfer of power from said charged plurality of capacitors to said battery based on a current charge status of said battery.

8. The portable electronic device according to claim 7, wherein said one or more circuits are further configured to charge said plurality of capacitors for a first time period based on movement of said portable electronic device, and
wherein said motion sensor is activated based on said movement of said portable electronic device.

9. The portable electronic device according to claim 7, wherein said one or more circuits are further configured to control a flow of current to said plurality of capacitors based on a determination that said plurality of capacitors are charged.

10. The portable electronic device according to claim 7, wherein said one or more circuits are further configured to restrict said transfer of power from said plurality of capacitors to said battery based on said current charge status of said battery and a first specified threshold value.

11. The portable electronic device according to claim 7, wherein said one or more circuits are further configured to transfer a defined amount of power to said motion sensor for said generation of said sensing pulse,
wherein said transfer of said defined amount of power is based on said current charge status of said battery being less than a second specified threshold value.

12. The portable electronic device according to claim 7, wherein said motion sensor is an accelerometer configured to be activated based on movement of said portable electronic device, and
wherein said sensing pulse, generated by said accelerometer on said activation, is utilized to recharge said battery.

13. The portable electronic device according to claim 7, wherein said motion sensor is a gyroscope configured to be activated based on movement of said portable electronic device, and
wherein said sensing pulse, generated by said gyroscope on said activation, is utilized to recharge said battery.

14. A method, comprising:
in a power generating circuitry:
   generating a sensing pulse based on activation of an accelerometer in said power generating circuitry;
   receiving said sensing pulse from said accelerometer;
   charging a plurality of capacitors in said power generating circuitry, based on said received sensing pulse; and
   controlling transfer of power from said charged plurality of capacitors to a battery based on a current charge status of said battery.

15. The method according to claim 14, further comprising:
charging said plurality of capacitors for a first time period based on movement of a portable electronic device that includes said power generating circuitry,
wherein said accelerometer is activated based on said movement of said portable electronic device.

16. The method according to claim 14, further comprising controlling a flow of current to said plurality of capacitors based on a determination that said plurality of capacitors are charged.

17. The method according to claim 14, further comprising restricting said transfer of power from said plurality of capacitors to said battery based on said current charge status of said battery and a first specified threshold value.

18. The method according to claim 14, further comprising transferring a defined amount of power to said accelerometer for said generation of said sensing pulse,
wherein said transfer of said defined amount of power is based on said current charge status of said battery being less than a second specified threshold value.

\* \* \* \* \*